United States Patent [19]
Spellane et al.

[11] Patent Number: 6,004,628
[45] Date of Patent: *Dec. 21, 1999

[54] METAL CORROSION PROTECTION WITH WASH COAT OF POLYPHENYLENE OXIDE

[75] Inventors: Peter J. Spellane, Ardsley-on-Hudson, N.Y.; Alexander L. Yahkind, West Bloomfield; Omar L. Abu-Shanab, Auburn Hills, both of Mich.

[73] Assignee: Polymer Alloys LLC, Ardsley-on-Hudson, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,315

[22] Filed: May 27, 1997

Related U.S. Application Data

[63] Continuation-in-part of application No. 08/599,840, Feb. 12, 1996.
[51] Int. Cl.$^6$ .................... B05D 1/18; B05D 3/02
[52] U.S. Cl. ............... 427/435; 427/385.5; 427/388.1; 428/418
[58] Field of Search .............. 427/385.5, 388.1, 427/388.4, 435, 126.3; 428/418, 335, 351, 355 EP

[56] References Cited

U.S. PATENT DOCUMENTS

| | | |
|---|---|---|
| 3,455,736 | 7/1969 | Davis et al. . |
| 3,471,587 | 10/1969 | Whittemore et al. ............ 260/823 |
| 3,907,613 | 9/1975 | Bures et al. ..................... 148/31.5 |
| 4,623,558 | 11/1986 | Lin ................................. 427/513 |
| 4,666,762 | 5/1987 | Yamamoto ...................... 427/409 |
| 4,915,985 | 4/1990 | Maxfield et al. ............... 427/126.3 |
| 5,021,259 | 6/1991 | Singelyn ......................... 427/115 |
| 5,077,332 | 12/1991 | Blattler et al. . |
| 5,204,140 | 4/1993 | Grosvenor et al. ............ 427/126.3 |
| 5,485,294 | 1/1996 | Sugiyama et al. ................ 427/96 |
| 5,633,086 | 5/1997 | Hsu et al. ........................ 427/215 |

*Primary Examiner*—Shrive Beck
*Assistant Examiner*—Bret Chen

[57] ABSTRACT

The corrosion protection of a metal article is accomplished by treating the metal article, which has not been treated with a conversion coating, with a wash coat solution comprising polyphenylene oxide, such as alkyl substituted polyphenylene oxide, preferably poly(2,6-dimethyl-1,4-polyphenylene oxide).

18 Claims, No Drawings

METAL CORROSION PROTECTION WITH WASH COAT OF POLYPHENYLENE OXIDE

This is a continuation-in-part of U.S. Ser. No. 08/599,840, filed Feb. 12, 1996.

BACKGROUND OF THE INVENTION

It is known, in general, in the prior art to coat metal surfaces with various phenylene oxide polymers to form coatings which provide some degree of corrosion protection to the metal surfaces.

Certain references suggest the use of electropolymerized polyphenylene oxides in corrosion resistant coatings including the following: M-C. Pham et al., Bull. Societe Chimique France 1985, 1169; M. Vijayan et al., Bull. Electrochemistry 1986, 2, 349; T. F. Otero et al., Makromol. Chem., Macromol. Symp. 1987, 8, 255; and S. Pitchumani et al., J. Electrochem. Soc. India 1990, 39, 211.

One approach that has been described utilizes the electrochemical deposition of various phenylene oxide polymers as coatings onto the metal by utilizing a solution containing the polymerizable phenol monomer(s). See, for example, Chemical Abstracts, Vol. 84, 181695h (1976) and Chemical Abstracts, Vol. 95, 188687t (1981).

An alternative approach to the foregoing electrochemical deposition techniques has relied upon the deposition of the prepolymerized PPO material onto the metal either from solution or as a powder coating:

In U.S. Pat. No. 3,455,736 to H. R. Davis et al., it is taught that certain types of PPO material are deficient in regard to their temperature or solvent resistance (see Col. 1, lines 35–47) and that such disadvantages can be remedied by the use of what is termed "certain linear or substantially linear" PPO materials. Such "selected polyphenyleneoxide oxide polymer" (see Col. 3, line 24) would, for example, not have alkyl group substitution on the arylene rings of the polymer and are formed from condensation reaction of potassium p-chlorophenolate.

More recent U.S. Pat. No. 3,907,613 teaches the use of a "substituted" PPO material, namely, 2,6-dimethyl-1,4-phenylene oxide, to coat metal surfaces, in violation of the teachings of the above described '736 patent. This patent indicates (at Col. 1, lines 13–21) that PPO films on metal lose their adhesion upon drying and are therefore "unsuitable to create protective layers on metal" unless expensive treatments of the metal with a thin layer of copper or silver are performed. As alternative approaches to such an expensive approach, this patent proposes either: (1) that the metal surface be provided with an oxidized conversion surface layer (see Col. 1, lines 28–33), such as by heating the metal (see Col. 1, lines 59–60); (2) that the PPO resin be modified by the inclusion of other resins and/or softening agents (see Col. 1, lines 34–37); (3) that corrosion inhibitor(s) be included in the PPO resin layer (see Col. 1, lines 39–45); or (4) that a further coating of PPO be used on top of the initial layer (see Col. 1, lines 46–49).

SUMMARY OF THE INVENTION

This invention relates to the corrosion protection of a metal article which is accomplished by treating the metal article, which has not been treated with a conversion coating, with a wash coat solution comprising polyphenylene oxide. Preferably, an alkyl-substituted polyphenylene oxide, such as poly(2,6-dimethyl-1,4-polyphenylene oxide, is employed. As used herein, the term "wash coat" is intended to mean a very thin, semitransparent coating coating having a thickness of no more than about 0.2 mil as a preliminary coating on the desired metal surface in accordance with the accepted meaning of that term to a person of ordinary skill in the art.

DESCRIPTION OF PREFERRED EMBODIMENTS

The present invention resides in the use of a PPO coating on an unpretreated metal article to corrosion protect that article and to the resulting coated metal article. In particular, and unlike the teaching supplied by U.S. Pat. No. 3,907,613, which is described above, the corrosion protection of a metal article is accomplished by treating the metal article, which has not been treated with a conversion coating, with a wash coat solution comprising polyphenylene oxide. The wash coat comprises the primary "treatment" of the metal surface.

Any type of metal article which would normally be prone to corrosion when exposed to environmental conditions can be used in the practice of the present invention. Metals which a person of ordinary skill in the art may select for practice of the present invention include carbon steel, stainless steel, aluminum, copper, and other normally corrodible metals.

In its broadest embodiment, the present invention can be used with any PPO materials, although the use of a substituted PPO material (or resin) is preferred. The use of either oligomers, low molecular weight polymers, and/or higher molecular weight polymers are all intended to be encompassed by the term "PPO". The preferred substituted PPO material is well known to persons of ordinary skill in the art and is a commercially available polymer product. The aryl rings contained in the polyphenylene oxide polymer are, in the more readily available and cost effective products, generally substituted with alkyl groups, preferably at the 2- and 6-positions on the ring. Generally speaking, the amount of PPO that is used in the wash coat solution with which the metal is treated will range anywhere from about 5% by weight to about 100% by weight of the solution used in fabricating the wash coat solution and need not be applied in concentrations or thicknesses high enough to yield a visually perceptible coating of PPO on the metal (e.g., a thickness to such coating of over about 0.5 mil). Examples of suitable solvents include the aliphatic and aromatic hydrocarbon solvents as exemplified by toluene and xylene. It is within the contemplation of the present invention to admix the wash coat solution containing the PPO polymer with other functional additives or resins, including, but not limited to, alkyds, polyesters, acrylics, and urethanes. It is also within the contemplation of the present invention, and generally preferred, to topcoat the wash coat with a polymeric topcoat of the type commonly used in the coating fields. Examples of classes of polymers which can be employed include epoxy, polyurethane, and alkyd resins, either alone or in combination.

The foregoing is further illustrated by the Examples which follow.

EXAMPLE 1

Cold rolled steel ("CRS") panels (from ACT Laboratories), which were 4"×12"×0.025" in size, were cleaned with methyl ethyl ketone (MEK). Poly(2,6-dimethylphenylene oxide), which hereinafter is referred to as the "preferred PPO", or similar term, namely, BLENDEX BHPP820 brand, from General Electric Specialty Chemicals, was dissolved in xylene to prepare a 10% (w/w)

solution. This preferred PPO solution was coated onto cleaned CRS using the draw down method (bar #12). The resulting PPO coating, having a dry film thickness of about 0.05 mils (as measured by a PERMASCOPE instrument from Fisher Technology Inc.), was subsequently coated with two-component polyurethane solution using a draw down bar (#50) forming a topcoat with a dry film thickness of about 1.5 mils (as also measured by a PERMASCOPE instrument from Fisher Technology Inc.). The preferred PPO thin layer and the top coat were allowed to air dry for one day and one week, respectively. Adhesion of the wash coat and top coat were measured by the crosshatch tape adhesion method (ASTM method D3359). It showed that the preferred PPO thin coating had very good adherence to untreated steel substrate (0% was removed). CRS panels coated with two-component polyurethane only were used as controls.

The coated panels were scribed (X-cut) and immersed in a tank containing aerated acidic salt water for five hundred hours. The acidic salt water had a specific gravity about 1.03, a pH of about 3–3.5, and was maintained at ambient temperature. The pH was adjusted by the addition of 37% hydrochloric acid. The immersed panels were evaluated for corrosion resistance before and after coating removal in terms of undercut corrosion, the degree of rusting, and the degree of blister formation utilizing ASTM methods D1654, D610, and D714 respectively.

The immersed, preferred PPO-coated panels showed no rust, no rust creep at the scribe, and no blisters. In comparison, the control panel showed large dense blisters and was almost totally rusted. After one thousand hours of aerated acidic salt water immersion, the preferred PPO panels continued to show no rust or blisters on the surface of the coated panel.

EXAMPLE 2

Panels coated with the preferred PPO thin coating and a two-component polyurethane top coat were prepared and tested for five hundred hours as described in Example 1. When the coating was removed from the immersed test panel, surprisingly, it was discovered that the steel surface was very clean with no residue of rust or blisters. In addition, the steel surface was very glossy. A xylene spot test indicated that a thin coating covered the steel surface. Infrared (IR) and gel permeation chromatography (GPC) spectra indicated that the thin coating had a number average molecular weight ($M_n$) of about 30,000 and weight average molecular weight ($M_w$) of about 55,000 as compared to an $M_n$ for the preferred PPO of about 21,000 and an $M_w$ for the preferred PPO of about 31,000). Its structure, as observed by IR spectroscopy, was slightly different from that of the neat, preferred PPO.

EXAMPLE 3

The panel preparation procedure described in Example 1 was repeated in order to make panels with the preferred PPO thin coat and a two-component urethane top coat. The coated panels were scribed (X-cut) and immersed in a tank filled with aerated salt water, 3% NaCl, specific gravity: about 1.03, for five hundred hours at ambient temperature. The immersed panels were evaluated for corrosion resistance before and after coating removal in terms of undercut corrosion, the degree of rusting, and the degree of blister formation utilizing ASTM methods D1654, D610, and D714, respectively. The immersed panels showed no rust, no rust creep at the scribed area, and very few, small blisters.

When the polyurethane coating was removed, surprisingly, it was discovered that the steel surface was very clean with no visual signs of rust or blisters. In contrast, the control panel displayed large dense blisters on the painted surface. When the coating was removed, the control panel was found to be rusted.

EXAMPLE 4

The panel preparation procedure described in Example 1 was repeated to make panels with a preferred PPO thin coat and a two-component urethane top coat. The panels were scribed and exposed to a salt fog environment (ASTM B117) for three hundred hours. The exposed panels were then evaluated for corrosion resistance before and after coating removal in terms of undercut corrosion, the degree of rusting, and the degree of blister formation utilizing ASTM methods D1654, D610, and D714 respectively. The exposed panels showed no rust, no rust creep at the scribed area, and very few, small blisters. In addition, the adhesion of the coating to the metal substrate was deemed adequate. On the other hand, the control panel showed large dense blisters and about 10% red rust.

EXAMPLE 5

This Example concerns application of a thin coat or "washcoat" of poly(2,6-dimethylphenylene oxide) to aluminum substrate and test results which indicate that the preferred PPO so-applied imparts enhanced resistance to oxidation to the aluminum substrate.

Poly(2,6-dimethylphenylene oxide), BHPP820 brand from General Electric Specialty Chemicals, Parkersburg, W. Va., ("preferred PPO") was dissolved in toluene with heating, to form a 10% (w/w) solution. An aluminum substrate (ACT aluminum 606IT6 from Advanced Coatings Technology, Hillsdale, Mich.), cut only and unpolished, was cleaned with acetone and methylethylketone. The preferred PPO solution was filtered through a 0.45 micron polytetrafluoroethylene filter, bar-coated with a #24 wire wound rod, baked for ten minutes at about 200° C., and cooled by immersion in tap water. The preferred PPO dry film thickness was determined to be less than about 0.1 mil, by comparison to a film of standard thickness, as measured with a "Minitest" thickness gauge (Electro-Physik, Köln). Some coupons so prepared were subsequently coated in a similar fashion with an advanced (high molecular weight) epoxy resin. Still other coupons were cleaned with solvent wiping and coated with epoxy resin only to a film thickness of about 0.4 mil.

In order to observe the anti-oxidation effect of the preferred PPO washcoat, a sample of each type was subjected to DC potentiodynamic measurement using the novel test procedure described and claimed in copending U.S. Ser. No. 08/852,649, filed May 7, 1997, entitled "Electrochemical Test for Measuring Corrosion Resistance", which is incorporated herein by reference. In this method, a coated aluminum coupon is made the working electrode of an electrochemical cell in which 0.1 N $NaHCO_3$ was the electrolyte. As an increasingly positive potential was applied to the working electrode by means of a potentiostat, the current between the working and graphite counterelectrodes was measured. For uncoated aluminum (Al/electrolyte), the current density at −0.5 V vs. a saturated calomel electrode (SCE) was about $10^{-5}$ $A/cm^2$ but it increased dramatically at more positive voltage. Pitting of the metal surface was evident after the cell and electrolyte were removed. Aluminum with the preferred PPO washcoat only (Al/PPO/ electrolyte) showed lower current density (about $10^{-6}$ A/cm$^2$ at –0.5 V) and showed almost no increase at voltages up to +1.0 V vs. SCE, nor was there evidence of pitting of the surface after the scan. An aluminum substrate with clear epoxy resin only (Al/epoxy/electrolyte) showed a current density of about $10^{-7}$ A/cm$^2$ at –0.5 V, but the current-voltage curve was noisy and did show sudden increases in current density at voltages positive of the open circuit potential. Aluminum with both the preferred PPO washcoat and an epoxy topcoat (Al/PPO/epoxy/electrolyte) showed a lower current density (about $10^{-9}$ A/cm$^2$) with some noise in the I-V curve.

These data indicate that (i) a thin coating of preferred PPO on aluminum makes the aluminum surface less easily oxidized and prevents pitting; and (ii) that aluminum coated with a preferred PPO undercoat and an epoxy topcoat is less easily oxidized than aluminum coated with epoxy resin only.

EXAMPLES 6–7

These Example illustrate that the use of poly(2,6-dimethylphenol), applied as a thin, neat coating to untreated aluminum and without topcoat, has the advantageous effect of increasing the resistance of the aluminum surface to pitting corrosion. Aluminum coated in this way is essentially identical in appearance and texture to the uncoated metal. The thin polymer coating is strongly adherent and electrically insulating.

Coating Aluminum Coupons with Poly(2,6-dimethylphenol)

Unpretreated aluminum coupons (designated "ACT aluminum 6061T6 03×06×032 cut only; unpolish") were obtained from ACT Laboratories, Inc., Hillsdale, Mich. 49242-0735 and were cleaned with acetone and methylethylketone washing. Then, 10.0 g of BLENDEX BHPP 820 brand poly(2,6-dimethylphenol) (from General Electric Specialty Chemicals, Parkersburg, W. Va.) was dissolved, with gentle heating, in 90 g of toluene. The resulting preferred PPO-toluene solution was filtered through a 0.45 micron polytetrafluoroethylene filter, was barcoated onto a steel coupon with a #24 wire wound rod, and was baked for five minutes at 200° C. in a forced air oven. After baking, the coupons were immersed in room temperature water and then dried in air. Aluminum coupons which had been cleaned with solvent, but not otherwise treated, were also prepared.

DC Potentiodynamic Behaviors of Coated and Uncoated Al

Using a DC potentiodynamic technique, the coated aluminum coupon was made the working electrode of an electrochemical cell, a graphite rod was the counter electrode, and a saturated calomel electrode was the reference. Increasingly positive potentials were imposed on the working electrode, and the current density between the working and counter electrodes was measured. Low current density in the region of 0 to +1 V vs. SCE was evidence of a diminished tendency to corrosion. An abrupt increase in current density at relatively positive applied voltages was correlated to pit formation, and the pits formed in this way could be seen without magnification. The high current density at relatively low applied voltage was further correlated to extensive pitting.

The foregoing Examples, since they are intended to merely illustrate certain embodiments of the present invention, should not be construed in a limiting sense. The scope of protection sought is set forth in the Claims which follow.

We claim:

1. A process for the corrosion protection of a metal article which comprises treating the metal article, which has not been treated with a conversion coating, with a wash coat solution comprising polyphenylene oxide in a solvent to produce a coating having a thickness of no more than about 0.2 mil.

2. A process as claimed in claim 1 wherein the polyphenylene oxide is an alkyl-substituted polyphenylene oxide.

3. A process as claimed in claim 1 wherein the polyphenylene oxide is poly(2,6-dimethyl-1,4-polyphenylene oxide).

4. A process for the corrosion protection of a ferrous metal article which comprises treating the metal article, which has not been treated with a conversion coating, with a wash coat solution comprising polyphenylene oxide in a solvent to produce a coating having a thickness of no more than about 0.2 mil.

5. A process as claimed in claim 4 wherein the polyphenylene oxide is an alkyl substituted polyphenylene oxide.

6. A process as claimed in claim 4 wherein the polyphenylene oxide is poly(2,6-dimethyl-1,4-polyphenylene oxide).

7. A process for the corrosion protection of an aluminum metal article which comprises treating the metal article, which has not been treated with a conversion coating, with a wash coat solution comprising polyphenylene oxide in a solvent to produce a coating having a thickness of no more than about 0.2 mil.

8. A process as claimed in claim 7 wherein the polyphenylene oxide is an alkyl substituted polyphenylene oxide.

9. A process as claimed in claim 7 wherein the polyphenylene oxide is poly(2,6-dimethyl-1,4-polyphenylene oxide).

10. The corrosion protected metal article resulting from the process of claim 1.

11. The corrosion protected metal article resulting from the process of claim 2.

12. The corrosion protected metal article resulting from the process of claim 3.

13. The corrosion protected metal article resulting from the process of claim 4.

14. The corrosion protected metal article resulting from the process of claim 5.

15. The corrosion protected metal article resulting from the process of claim 6.

16. The corrosion protected metal article resulting from the process of claim 7.

17. The corrosion protected metal article resulting from the process of claim 8.

18. The corrosion protected metal article resulting from the process of claim 9.

* * * * *